US006987745B1

(12) United States Patent
Bruzzone

(10) Patent No.: US 6,987,745 B1
(45) Date of Patent: Jan. 17, 2006

(54) CONTROL OF MULTIDIRECTIONAL ANTENNA STRUCTURE IN A PRIMARY STATION FOR USE IN A RADIO COMMUNICATION NETWORK

(75) Inventor: Raul Bruzzone, Le Mans (FR)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/551,816

(22) Filed: Apr. 18, 2000

(30) Foreign Application Priority Data

Oct. 26, 1999 (EP) ................................ 99402664

(51) Int. Cl.
*H04Q 7/00* (2006.01)

(52) U.S. Cl. ...................................................... 370/331

(58) Field of Classification Search ................ 370/339, 370/331, 329, 334
See application file for complete search history.

(56) References Cited

U.S. PATENT DOCUMENTS 4,419,766 A * 12/1983 Goeken et al. ............... 455/62
5,123,112 A * 6/1992 Choate ....................... 455/524
5,515,378 A * 5/1996 Roy et al. ................... 370/334
5,617,102 A * 4/1997 Prater ......................... 342/374
6,100,843 A * 8/2000 Proctor et al. .............. 342/368
6,314,269 B1 * 11/2001 Hart et al. ................. 455/12.1
6,556,832 B1 * 4/2003 Soliman ................ 342/357.06

FOREIGN PATENT DOCUMENTS

EP 0752734 A1 8/1997
EP 0812026 A2 * 12/1997
EP 0812026 A3 * 12/1997
WO 9829968 A2 * 7/1998
WO 9829968 A3 * 7/1998
WO 9916221 A1 * 4/1999

* cited by examiner

*Primary Examiner*—Ricky Ngo
*Assistant Examiner*—Derrick W. Ferris
(74) *Attorney, Agent, or Firm*—Larry Liberchuk

(57) ABSTRACT

A method for controlling a multidirectional antenna structure in a primary station for use in a radio communication networks comprising a plurality of secondary stations. This method involves an acquisition step of acquiring data relating to secondary stations, a selection step of selecting, based on acquired data, an active secondary station and alternative secondary stations suitable for becoming active, a calculation step of calculating the directions of signals received from the selected secondary stations, a storage step of storing the calculated directions, and a control step of controlling said antenna structure depending on stored directions.

12 Claims, 7 Drawing Sheets

CONTROL OF MULTIDIRECTIONAL ANTENNA STRUCTURE IN A PRIMARY STATION FOR USE IN A RADIO COMMUNICATION NETWORK

FIELD OF THE INVENTION

The invention relates to a primary radio station for use in a communication system comprising a plurality of secondary radio stations, said primary station having a multi-directional controllable antenna structure.

The invention also relates to a method for controlling a multi-directional controllable antenna structure in a primary radio station intended to communicate with secondary stations of a radio communication network.

The invention finally relates to a radio communication system comprising such a primary radio station, and to a computer program comprising computer program code means to make such a primary radio station execute such a controlling method.

BACKGROUND OF THE INVENTION

Such primary stations are for example known from EP patent application 0 752 735 A1. The advantages of mobile station based spatial diversity are well known: it provides reduced co-channel interference and consequently increased network capacity. It also reduces the power consumption in mobile stations, consequently extending the operating time between two battery charges.

One of the aims of the invention is to propose a way of controlling a multi-directional controllable antenna structure in a primary radio station intended to communicate with secondary stations of a radio communication network.

SUMMARY OF THE INVENTION

This is achieved with a primary radio station wherein, according to the invention, the secondary stations that are active (i.e. the secondary stations that are actively communicating with the primary radio station) or that are suitable for becoming active (i.e. that may become active at any time depending on the position of the primary radio station in the network) are determined by the primary radio station. The directions of signals received from these active and alternative secondary stations are calculated and stored. In this way the primary station can control the antenna structure depending on the direction stored for the secondary station with which it is currently communicating.

In a preferred embodiment the primary station has means for tracking the direction of an active secondary station with said controllable antenna structure. This embodiment allows to remain in communication even in case of very sudden movement of the user, notably in case of rotation.

When the antenna structure comprises a plurality of directional antennas, a particularly efficient way to determine active and alternative secondary stations is to acquire quality data relating to secondary stations—antenna pairs, and to make a selection based on the acquired quality data. For example, the secondary stations are selected only if their quality data are above a predetermined threshold. Among selected secondary stations, the secondary station of highest quality is, for example, selected as an active secondary station and the other secondary stations are selected as alternative secondary stations.

DESCRIPTION OF PREFERRED EMBODIMENT

Figure 1:
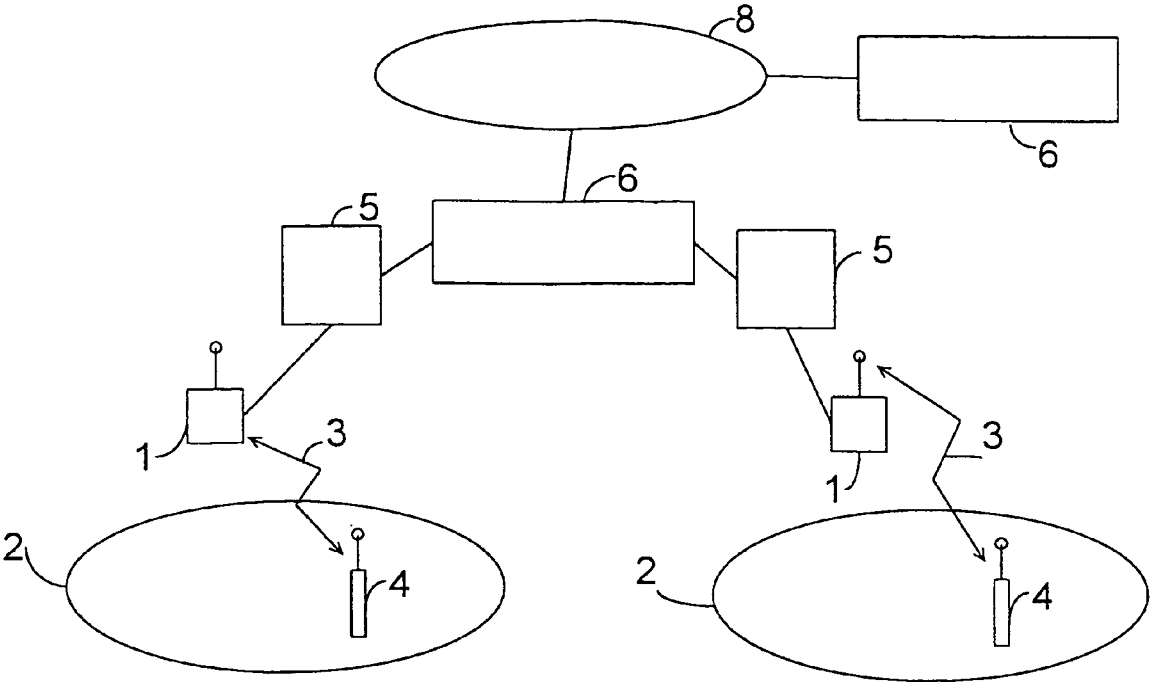
FIG. 1 is a drawing of a radio communication system according to the invention.

An example of a radio communication network according to the invention is represented in FIG. 1. This radio communication network is a mobile phone spread spectrum communication network. But the invention also applies to radio communication networks having other applications and/or using other multiple access techniques. For example, it also applies to satellite radio communication networks, or time and/or frequency—division multiple access techniques. When secondary stations are satellite stations, updatings are sufficiently frequent for the direction of the signal received from the secondary station to remain approximately constant despite the movements of the satellite.

In the radio communication network described in FIG. 1, the secondary radio stations are base stations and the primary radio stations are mobile stations. Each base station 1 covers a specific cell 2 (that can be sectored) and is intended to communicate by radio links 3 with mobile stations 4 located in this specific cell 2. Each base station is connected through a base station controller 5 to a mobile telephone exchange 6. One base station controller 5 may connect several base stations 1, and one mobile telephone exchange 6 may connect several base station controllers 5. Mobile telephone exchanges 6 are interconnected via e.g. the public switched telephone network 8. Cells 2 are overlapping, so that a mobile station associated to one cell is able to detect signals of several adjacent cells in different directions. This feature serves notably the purpose of moving from one cell to another without interruption of communications. This process is usually called handoff or handover.

Figure 2:
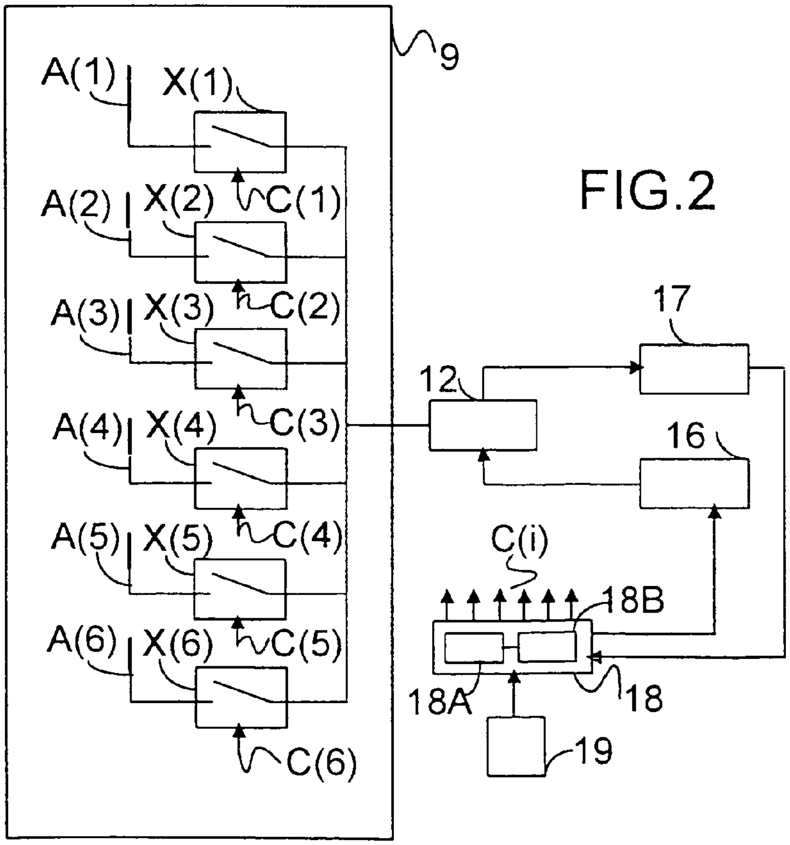
FIG. 2 is a block diagram of a primary station according to the invention.

FIG. 2 gives a representation in blocks of an example of a mobile station 4. This mobile station 4 comprises a controllable antenna structure 9. This controllable antenna structure 9 comprises one omni-directional antenna A(1) and five directional antennas A(2) to A(6). Antennas A(i) are connected to a duplexer 12 via switches X(i) respectively. Switches X(i) are respectively controlled by signals C(i). The duplexer 12 is connected to a transmitting device 16 and to a receiving device 17. Signals C(i) are output by a microprocessor 18. The microprocessor 18 has a memory 18*a* for storing data and processing means 18*b* for processing data, notably data received from receiving device 17, data to be sent to transmitting device 16, and data received from a sensing device 19.

Controllable antenna structures comprising a plurality of directional antennas are particularly well suited to mobile phones operating at 2 Ghz or even higher frequencies. In fact current technologies do not allow the manufacturing of small phase-arrays at those frequencies.

Figure 3:
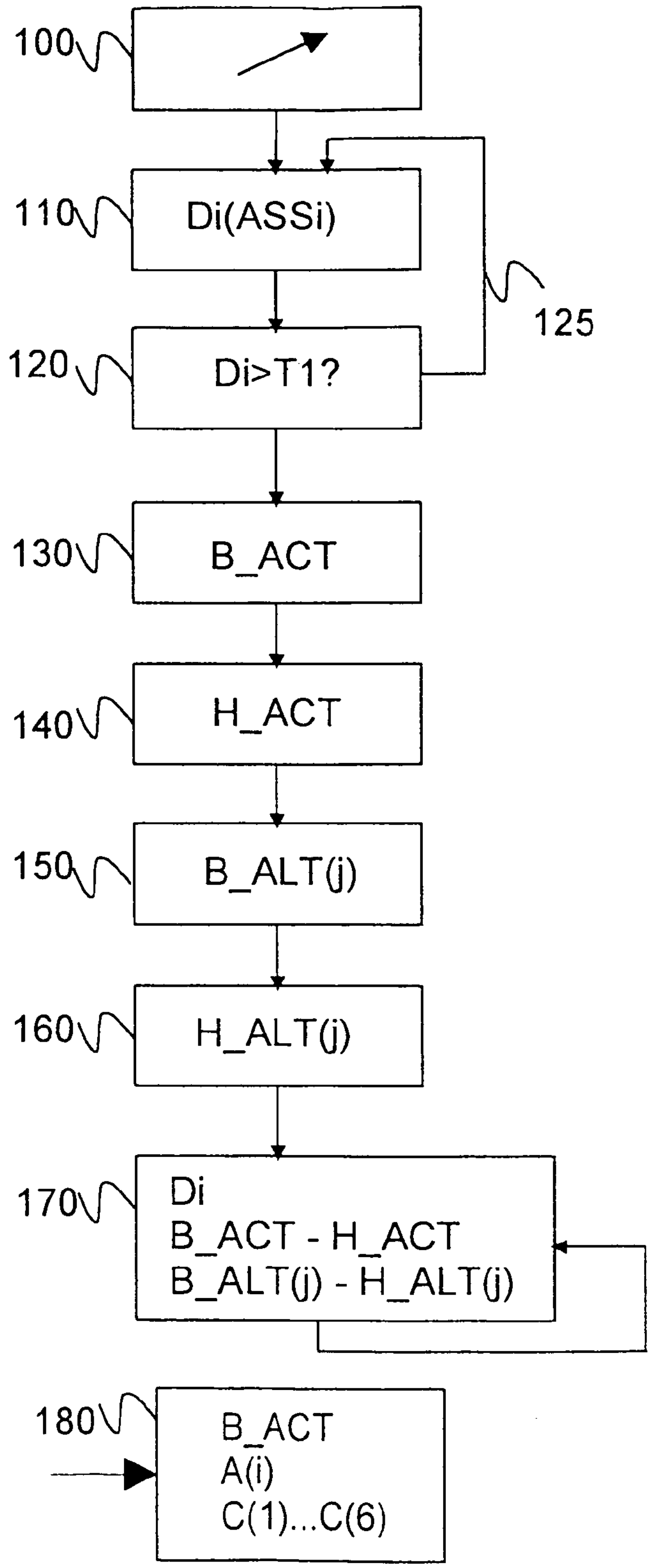
FIG. 3 is a chart showing the operations of a primary station as regards the control of its antenna structure.

FIG. 3 is a general description of the operations of a primary station as regards the control of its antenna structure. Details on specific parts of this diagram will be given later on.

In step 100 the primary station is powered on and starts an initialization phase comprising steps 110 to 160. In step 110, the primary station acquires data $D_i$ relating to available secondary stations $ASS_i$. In step 120, acquired data are checked using a predefined criterion. If no secondary station complies with this criterion (arrow 125), this means that communication is impossible and operations reinitiate in step 110 (due to change in the position of the primary station or to modification of the radio environment the situation may improve afterwards). In step 130, the secondary station whose data best comply with the predefined criterion is selected to be the active secondary station B_ACT (the active secondary station is intended to actively communicate with the primary radio station). Such a selection implies a request from the primary radio station to the selected secondary radio station and an acknowledgement by the selected secondary radio station. If the secondary radio station rejects the request, another secondary radio station must be selected. In step 140, the primary station calculates and stores the direction of signals received from this active secondary station H_ACT. This direction is called heading of the secondary station. At this stage the primary station is able to control its antenna structure depending on the heading of the active secondary station. In step 150, alternative secondary stations B_ALT(j), suitable for becoming active (i.e. complying with the above mentioned criterion), are selected. These alternative secondary stations may become active in case of handoff (a handoff occurs when the primary radio station has moved so that there is one alternative secondary station that becomes more capable of carrying communications than the current active secondary station).

In step 160, the primary station calculates and stores the directions of signals received from these alternative secondary stations H_ALT(j).

At this stage the initialization of the primary station is completed. Then (in step 170) data relating to available secondary stations are regularly updated as is the selection of active and alternative secondary stations. And headings of new active or alternative secondary stations are calculated and stored. In this way the primary station is able to control its antenna structure depending on the heading of the active secondary station, at least once, even after a handoff (step 180).

Figure 4:
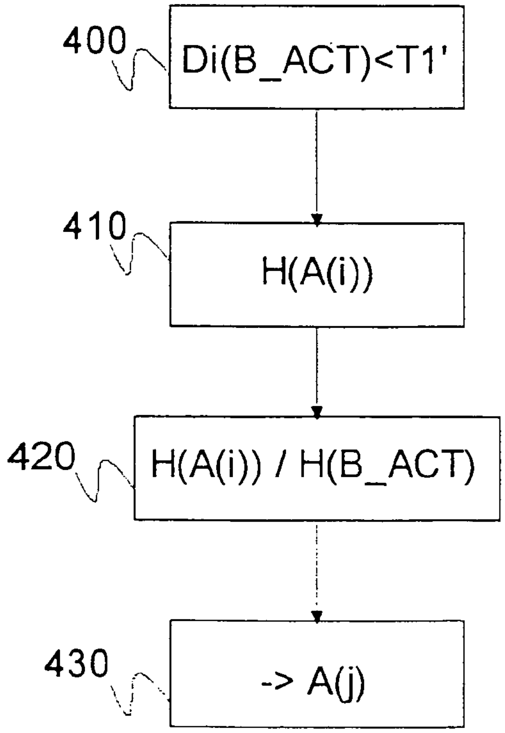
FIG. 4 is a chart showing the secondary station tracking process, FIG. 5 gives a representation of a table called RANK table used for storing data relating to secondary stations and antennas.

In a preferred embodiment the primary station also tracks the direction of the currently active secondary station with its controllable antenna structure. An example of such a tracking process will now be described by referring to FIG. 4 for an antenna structure that comprises a plurality of directional antennas. In step 400 the primary station detects that the quality of the communication with the currently active secondary station is falling below a predefined level T1'. The headings H(A(i)) of the directional antennas of the primary station are known in a coordinate system attached to the primary station. In step 410 they are converted into a coordinate system attached to the earth by using a conversion method described below. Then, in step 420, the results of these conversions are compared with the heading of the currently active secondary station. And in step 430 the antenna whose heading in the earth coordinate system is the nearest the heading of the second station is selected to carry on with the communication. This embodiment allows to remain in communication even in case of very sudden movement of the user, notably in case of rotation.

Details will now be given on specific parts of the diagram of FIG. 3.

I. Selection of the Active Secondary Station

Data relating to available secondary stations are acquired first. Then the active secondary station is selected based on these acquired data.

In a first embodiment these data are acquired for all available pairs of secondary station and antenna.

These data are quality data representative of the quality of the signal received from a specific secondary station via a specific antenna. These quality data may be, for example, the received power or, when available, the Bit Error Rate (BER) or the Frame Error Rate (FER). The BER is simple and fast to evaluate. Its evaluation can be repeated very frequently. The FER gives a more precise indication of the quality of the received signal.

Figure 5:
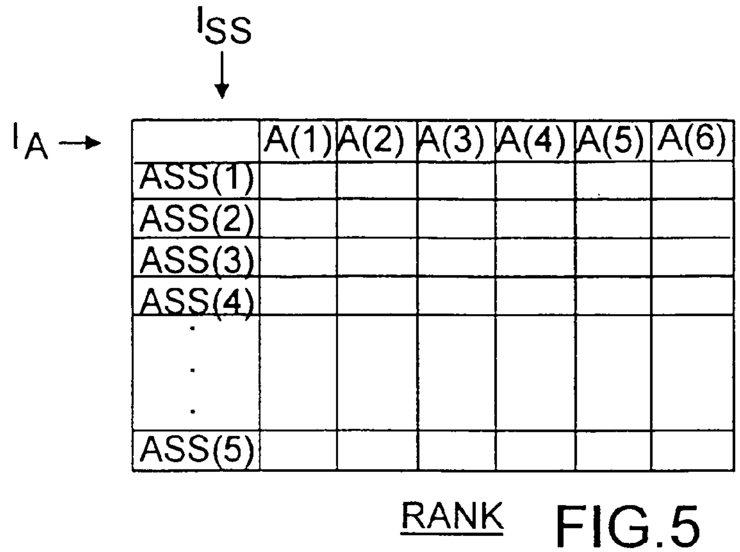

Quality data obtained for all pairs of secondary station and antenna are stored in a table called RANK. This table is represented in FIG. 5: it has two entries, one for the secondary station identifier $I_{SS}$ and the other for the antenna identifier $I_A$. It gives the value of the calculated quality data.

An active secondary station is selected if there is at least one secondary station whose quality data (here the received power) are above a first predefined threshold (T1). In such a case the active secondary station is the secondary station of the pair having the highest quality data. In this embodiment the best antenna to be used with this secondary station is obtained at the same time: it is the antenna of the pair having the highest quality data.

In a second embodiment the quality data are acquired for each available secondary station using a predefined state of the controllable antenna structure, for example, by using an omnidirectional antenna, if available. The secondary station having the highest quality data is then selected to be the active secondary station. In this embodiment the best state of the antenna is not available at this stage. Once the heading of the active secondary station will be available, the primary station will be in position to determine the best direction for the controllable antenna structure. This process will be described in more detail in the following of the description.

II. Selection of the Alternative Secondary Station

In a first embodiment the selection of alternative secondary stations is based on the data acquired in step 110.

In a second embodiment the active secondary station that has been selected sends a list of “neighboring” secondary stations to the primary station. And the primary station acquires quality data relating to these neighboring secondary stations. The new acquired data are taken into account (with or without the quality data acquired in step 110) for the selection of the alternative secondary stations.

In practice the secondary stations contained in the “neighboring” list are aided to the RANK table.

III. Calculation of the Heading of the Selected Secondary Stations

The first step (described in paragraph III.1) consists of calculating the heading of the selected secondary stations in a coordinate system attached to the primary station (called local coordinate system in the following of the description). Then the second step (described in paragraph III.2) consists of converting the calculated headings in a coordinate system attached to the Earth (called earth coordinate system in the rest of the description). By doing so, the stored heading is independent of the movement of the primary stations.

Figure 6:
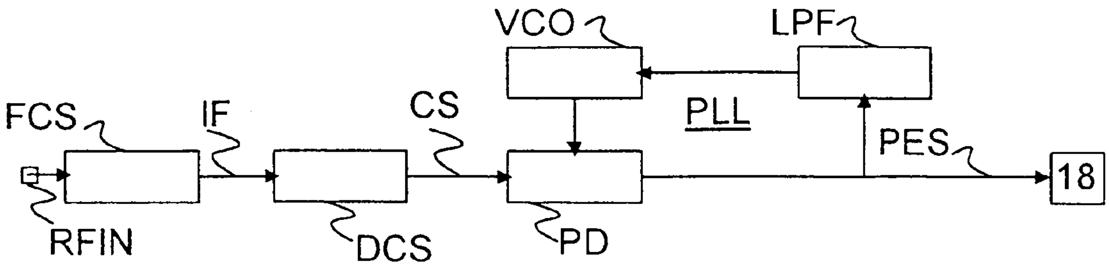
FIG. 6 is a block diagram of the receiving part of a primary station according to the invention.

III.1: Calculation of the Heading in a Coordinate System Attached to the Primary Station The following part describes an example of a calculation method by referring to FIG. 6, for a CDMA (Code-Division Multiple Access) primary station whose antenna structure comprises a plurality of antennas. According to FIG. 6 the receiving device 17 of the primary station comprises the following functional parts: a radio-frequency input RFIN, a frequency conversion state FCS, a de-spreading circuit DSC, a phase-locked loop PLL. The phase-locked loop PLL further comprises a phase-detector PD, a loop filter LPF and a controllable oscillator VCO.

Such a primary station basically operates as follows. The microprocessor 18 controls the antenna-switches X(1)–X(6) so that one of the directional antennas A(2)–A(6) is coupled to the radio-frequency input RFIN. The frequency conversion stage FCS converts a radio signal RF at the radio frequency input RFIN into an intermediate-frequency signal IF. Both the radio frequency signal RF and the intermediate-frequency signal IF are spread spectrum signals. The de-spreading circuit DSC de-spreads, in effect, the intermediate frequency signal IF. Accordingly, the de-spreading circuit DSC applies a narrow-spectrum carrier signal CS to the phase-locked loop PLL. The phase-detector PD of the phase-locked loop PLL applies a phase-error signal PES to the microprocessor 18.

The microprocessor 18 controls the antenna-switches X(1)–X(6) in the following manner. Let it be assumed that antenna A(2) is coupled to the radio-frequency input RFIN. The microprocessor 18 determines during which periods the narrow-spectrum carrier signal CS is substantially free of phase modulation. It may do so, for example, by identifying when the radio signal RF conveys a series of zeroes or ones as information. During such a period, the microprocessor 18 de-couples the antenna A(2) so as to couple another antenna, for example, antenna A(3), to the radio frequency input RFIN. Thus, in effect, the microprocessor 18 switches from antenna A(2) to antenna A(3). This will cause a sudden change in the phase-error signal PES. The microprocessor 18 measures this change, which is representative of a phase difference between the radio signal RF at the antenna A(2) and A(3). This phase difference is representative of the difference of distance between the two radio signals. From this information, the microprocessor 18 calculates an angle of arrival of the radio signal RF in a Cartesian system, which is defined by the antennas A(2) and A(3). Subsequently, the microprocessor 18 switches from antenna A(3) to another antenna, for example antenna A(4), and calculates an angle of arrival in another Cartesian system which is defined by antennas A(3) and A(4). Using the calculated angles of arrival, the microprocessor 18 calculates a tridimensional bearing vector which points to the source of the radio signal RF. This vector is the heading of the emitting secondary station.

This method is described in EP patent application n° 98402738.3 applied by Koninklijke Philips Electronics N.V. and not yet published.

Other methods can be used to obtain the headings of the active and alternative secondary stations. For example secondary station headings can be obtained by GPS measurements (GPS stands for Global Positioning System).

III.2: Conversion in a Coordinate System attached to the Earth

Figure 7:
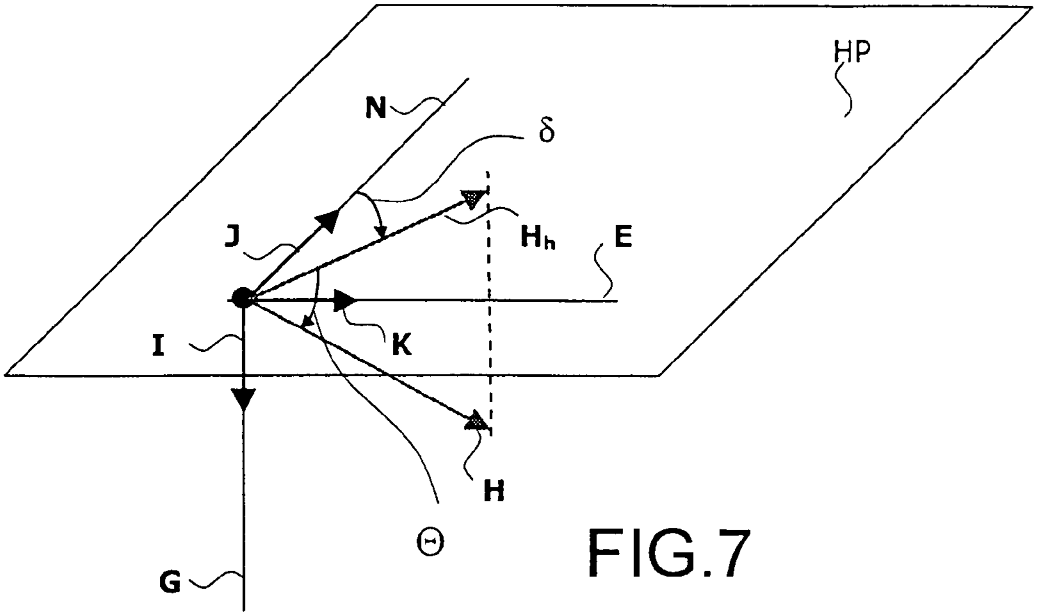
FIG. 7 shows the gravitational and magnetic fields in a coordinate system attached to the earth.
Figure 8:
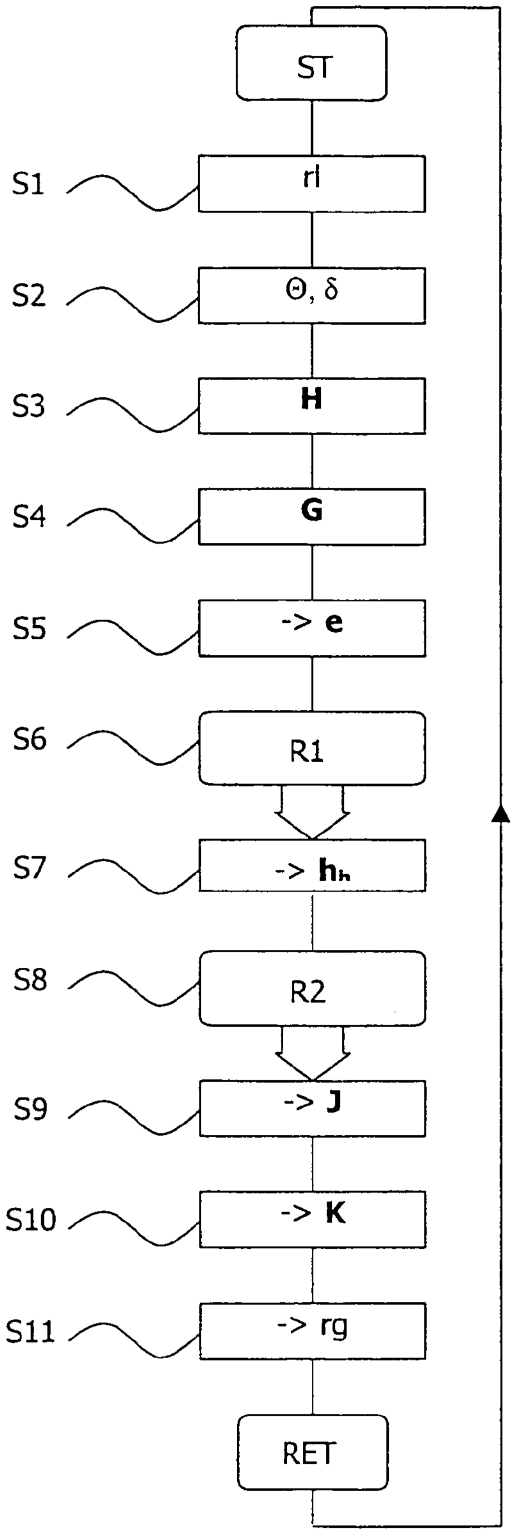
FIG. 8 is a chart of a converting method used for converting a vector known in a coordinate system attached to the primary radio station into a coordinate system attached to the earth.

The following part describes an example of a conversion method by referring to FIGS. 7 and 8. This conversion method uses the three-dimensional measurements of the earth magnetic field and of the earth gravitational field, as well as the values of reference angles associated with the earth magnetic field, the inclination and the declination, which will be defined later. To provide measurements of the earth magnetic (H) and gravitational (G) fields the primary station must have magnetic field sensors and gravitational field sensors. This means that in this embodiment the sensing device 19 of FIG. 2 comprises magnetic field sensors and gravitational field sensors. Microprocessor 18 reads the outputs from each sensor and makes the calculations required to make the conversion.

The magnetic field and the gravitational field sensors are preferably three-dimensional sensors. Preferably, the three-dimensional magnetic field sensor is a sensor using three, preferably orthogonal, AMR (Anisotropic Magneto Resistive) magnetic field sensor elements, which are cheap and have a very fast real-time response characteristic. The three-dimensional gravitational field sensor is preferably the association of two two-dimensional gravitational field sensor elements which are also quite cheap components and have a fast real time response.

The local coordinate is defined by a set of three orthogonal vectors (i, j, k) of unit length (see FIG. 7). The earth coordinate system is defined by a set of three orthogonal vectors (I, J, K) of unit length. The I, J, K system is defined according to FIG. 7:

- I is coincident with the direction of the earth gravitational field (G).
- J is coincident with the direction of the geographic north (N).
- K is coincident with the direction of the geographic east (E).

The heading of a secondary station is defined by a vector r. With reference to the local coordinate system, this vector is expressed as:

$$r=r_x i+r_y j+r_z k \quad [1]$$

where $r_x$, $r_y$ and $r_z$ are obtained as explained in paragraph III.1.

This heading is expressed in the earth coordinate system as:

$$r=R_x I+R_y J+R_z K \quad [2]$$

where the coordinates $R_x$, $R_y$ and $R_z$ are unknown.

FIG. 8 describes the different steps that lead to the conversion from the local coordinates ($r_x$, $r_y$, $r_z$) to the earth coordinates ($R_x$, $R_y$, $R_z$).

At appropriate time intervals, the computing procedure starts (ST).

During a step S1, the local coordinates (r1) corresponding to the vector r are read.

During a step S2, the values of reference angles associated with the earth magnetic field H are downloaded. These reference angles are the inclination and the declination and are defined, according to FIG. 7.

declination (δ) is the angle between the direction of the geographic north (N) and the horizontal projection $H_h$ of the earth magnetic field H, in the horizontal plane (HP). This value is measured positive through east (E), and varies between 0 and 360 degrees.

inclination (θ) is the angle between the horizontal projection $H_h$ of the earth magnetic field H, and the earth magnetic field H. Positive inclinations correspond to a vector H pointing downward, negative inclinations to a vector H pointing upward. Inclination varies between −90 and 90 degrees.

The values of the inclination and declination depend on the position of the primary station on earth. They are calculated on the basis of the geographical coordinates of the primary station. The declination and inclination angles are also variable with time, following to the so-called "secular" variations. Dedicated observatories have measured these variations during several centuries. The worst-case secular variation in the last 500 years has been 2 degrees per decade. Taking into account that the directivity of antennas is wider than this figure, it is possible to use a fixed value for the declination and inclination without a significant impairment to the performance of the communication system.

In the present embodiment, the values of the declination and inclination at the position of the primary station can be obtained in different ways:

By reception from the secondary station. The secondary station may broadcast the declination and inclination of its position, by a common downlink channel. This type of channel is found in most cellular systems. Although the values of declination and inclination at the secondary station are not exactly the same as in the position of the primary station, the difference is very small for the normal size of a communication cell.

By reading an on-board geographical data base of declinations and inclinations expressed as a function of the primary station geographical coordinates (latitude/longitude). The primary station coordinates are provided by the fixed part of the communication network (using, for example, trilaterization methods) or by an on-board GPS receiver.

By periodic consultation of an internet geographical data base that returns the declination and inclination as a function of the primary station geographical coordinates. Radio packet services available in all second and third generation mobile network standards are able to provide this service in a fast, reliable and inexpensive way.

The values of the inclination and declination can be stored in any type of memory, depending on the previous described acquisition mode, for example, in a flash memory.

During step S3, magneto-resistive field sensors with the sensitivity and accuracy required for the measurement of the earth magnetic field and attached to the primary station, provide the measurements of the local coordinates of the earth magnetic field H. The earth magnetic field is expressed in the local coordinate system as follows:

$$H=H_x i+H_y j+H_z k \quad [3]$$

The direction of the earth magnetic field is then expressed by a vector h having the same direction as H, but unitary length:

$$h=\frac{1}{H}H=\frac{H_x}{H}i+\frac{H_y}{H}j+\frac{H_z}{H}k=h_x i+h_y j+h_z k \quad [4]$$

where H is the field strength.

During step S4, gravitational field sensors with adequate sensitivity and accuracy required for the measurement of the earth gravitational field and attached to the primary station, provide the measurements of the local coordinates of the earth gravitational field G. The earth gravitational field is expressed in the local coordinate system as follows:

$$G=G_x i+G_y j+G_z k \quad [5]$$

The direction of the earth gravitational field is expressed by a vector g having the same direction as G, but unitary length:

$$g=\frac{1}{G}G=\frac{G_x}{G}i+\frac{G_y}{G}j+\frac{G_z}{G}k=g_x i+g_y j+g_z k \quad [6]$$

According to FIG. 7, I is a vector of unit length whose direction is coincides with the earth gravitational field. This is precisely the definition of g, which is expressed according to [6]. Therefore:

$$I=g_x i+g_y j+g_z k \quad [7]$$

Vector h is carried over J by means of two consecutive rotations:

A first rotation around the axis I ⓧ h, of angle θ. This movement will put h over the horizontal plane (HP).

A second rotation around the axis I, of angle δ. This movement will put h directly over the vector J.

Vector rotations are linear transformations that are represented by a 3×3 matrix: $R_i$ (u,α). The components of $R_i$ are expressed as a function of the coordinates of the vector defining the rotation axis u ($u_x$, $u_y$, $u_z$) and of the rotation angle (α) as follows:

$$R_i=\begin{bmatrix} r_{11} & r_{12} & r_{13} \\ r_{21} & r_{22} & r_{23} \\ r_{31} & r_{32} & r_{33} \end{bmatrix} \text{ with } \begin{cases} r_{11}=u_x^2+(1+u_x^2)\cos\alpha \\ r_{12}=u_x u_y(1-\cos\alpha)+u_z\sin\alpha \\ r_{13}=u_x u_z(1-\cos\alpha)-u_y\sin\alpha \\ r_{21}=u_x u_y(1-\cos\alpha)-u_z\sin\alpha \\ r_{22}=u_y^2+(1-u_y^2)\cos\alpha \\ r_{23}=u_y u_z(1-\cos\alpha)+u_x\sin\alpha \\ r_{31}=u_x u_z(1-\cos\alpha)+u_y\sin\alpha \\ r_{32}=u_x u_z(1-\cos\alpha)-u_x\sin\alpha \\ r_{33}=u_z^2+(1-u_z^2)\cos\alpha \end{cases}$$

During step S5, the coordinates of the vector e of unit length corresponding to the first rotation axis are calculated as follows:

$$e=\frac{I\otimes h}{|I\otimes h|} \quad [8]$$

The components of e are derived using the expressions [4] and [7]:

$$e_x=\frac{g_y h_z-g_z h_y}{\sqrt{(g_y h_z-g_z h_y)^2+(g_z h_x-g_x h_z)^2+(g_x h_y-g_y h_x)^2}} \quad [9]$$

$$e_y=\frac{g_z h_x-g_x h_z}{\sqrt{(g_y h_z-g_z h_y)^2+(g_z h_x-g_x h_z)^2+(g_x h_y-g_y h_x)^2}} \quad [10]$$

-continued $$e_z = \frac{g_x h_y - g_y h_x}{\sqrt{(g_y h_z - g_z h_y)^2 + (g_z h_x - g_x h_z)^2 + (g_x h_y - g_y h_x)^2}} \quad [11]$$

During step S6, the first rotation $R_1(e,\theta)$ is called. The calculated coefficients of the matrix corresponding to this vector rotation are:

$$\overline{r_{ij}} = r_{ij}(e_x, e_y, e_z, \theta) = \begin{bmatrix} \overline{r_{11}} & \overline{r_{12}} & \overline{r_{13}} \\ \overline{r_{21}} & \overline{r_{22}} & \overline{r_{23}} \\ \overline{r_{31}} & \overline{r_{32}} & \overline{r_{33}} \end{bmatrix} \quad [12]$$

During step S7, the vector $h_h$ is derived as follows:

$$h_h = R_1 h \quad [13]$$

After computing, it results in:

$$h_h = h_{hx} i + h_{hy} j + h_{hz} k \; [14]$$

where:

$$h_{hx} = h_x \overline{r_{11}} + h_y \overline{r_{21}} + h_z \overline{r_{31}} \quad [15]$$

$$h_{hy} = h_x \overline{r_{12}} + h_y \overline{r_{22}} + h_z \overline{r_{32}} \quad [16]$$

$$h_{hz} = h_x \overline{r_{13}} + h_y \overline{r_{23}} + h_z \overline{r_{33}} \quad [17]$$

During step S8, the second rotation $R_2(g, \delta)$ is called. The calculated coefficients of the matrix corresponding to this vector rotation are:

$$\overline{\overline{r_{ij}}} = r_{ij}(g_x, g_y, g_z, \delta) = \begin{bmatrix} \overline{\overline{r_{11}}} & \overline{\overline{r_{12}}} & \overline{\overline{r_{13}}} \\ \overline{\overline{r_{21}}} & \overline{\overline{r_{22}}} & \overline{\overline{r_{23}}} \\ \overline{\overline{r_{31}}} & \overline{\overline{r_{32}}} & \overline{\overline{r_{33}}} \end{bmatrix} \quad [18]$$

During step S9, the vector J is derived as follows:

$$J = R_2 h_h \quad [19]$$

After computing, it results in:

$$J = J_x i + J_y j + J_z k \quad [20]$$

where:

$$J_x = h_{hx} \overline{\overline{r_{11}}} + h_{hy} \overline{\overline{r_{21}}} + h_{hz} \overline{\overline{r_{31}}} \quad [21]$$

$$J_y = h_{hx} \overline{\overline{r_{12}}} + h_{hy} \overline{\overline{r_{22}}} + h_{hz} \overline{\overline{r_{33}}} \quad [22]$$

$$J_z = h_{hx} \overline{\overline{r_{13}}} + h_{hy} \overline{\overline{r_{23}}} + h_{hz} \overline{\overline{r_{33}}} \quad [23]$$

During step S10, Vector K is obtained as follows:

$$K = K_x i + K_y j + K_z k = I \otimes J \quad [24]$$

Using the expressions of I and J given by [7] and [20]:

$$K = (g_y J_x - g_z J_y) i + (g_z J_x - g_x J_z) j + (g_x J_y - g_y J_x) k \quad [25]$$

During step S11, the expression of the vector r in the local coordinate system is derived from the expression [2] of the same vector in the earth coordinate system, and by replacing I, J and K with their expressions [7], [20] and [25]:

$$r = (R_x g_x + R_y J_x + R_z K_x) i + (R_x g_y + R_y J_y + R_z K_y) j + (R_x g_z + R_y J_z + R_z K_z) k \quad [26]$$

Considering the expression [26] of r and identifying the coefficients to the ones of the expression [1] results in:

$$g_x R_x + J_x R_y + K_x R_z = r_x \quad [27]$$

$$g_y R_x + J_y R_y + K_y R_z = r_y \quad [28]$$

$$g_z R_x + J_z R_y + K_z R_z = r_z \quad [29]$$

The solution of the linear system with unknowns $R_x$, $R_y$, $R_z$ is obtained by using the Cramer's method, and provides the coordinates (rg) of the heading of the secondary station in the earth coordinate system:

$$R_x = \frac{\Delta_x}{\Delta} \quad [30]$$

$$R_y = \frac{\Delta_y}{\Delta} \quad [31]$$

$$R_z = \frac{\Delta_z}{\Delta} \quad [32]$$

where:

$$\Delta_x = J_y K_z r_x + J_x K_y r_z + J_z K_x r_y - (j_y K_x r_z + J_z K_y r_x + J_x K_z r_y) \quad [33]$$

$$\Delta_y = g_x K_z r_y + g_z K_y r_x + g_y K_x r_z - (g_z K_x r_y + g_x K_y r_z + g_y K_z r_x) \quad [34]$$

$$\Delta_z = g_x J_y r_z + g_z J_x r_y + g_y J_z r_x - (g_z J_y r_x + g_x J_z r_y + g_y J_x r_z) \quad [35]$$

$$\Delta = g_x J_y K_z + g_z J_x K_y + g_y J_z K_x - (g_z J_y K_x + g_x J_z K_y + g_y J_x K_z) \quad [36]$$

The values $R_x$, $R_y$ $R_z$ are stored.

At the end of the calculation, the procedure returns (RET) to the starting point.

This conversion method is described in EP patent application n° 99400960.3 applied by Koninkijke Philips Electronics N.V. and not yet published. This method is particularly advantageous, but other conversion methods could also be used, for example methods using a gyroscope or a GPS (Global Positioning System) systems. Thus the above described method if not restrictive.

IV. Storage of Headings

Once the headings have been calculated in the earth coordinate system, they are stored. In practice three sets are built: a first set called active set contains the active secondary station(s), a second set called alternative set contains the alternative secondary stations, and a third set called remaining set contains all other available secondary stations. These sets use the identifiers of the secondary stations as pointers. The active set and the alternative set contain for each secondary station the quality data and the three coordinates of the secondary station's heading in the coordinate system attached to the earth. The remaining set only contains the quality data.

Figure 9:
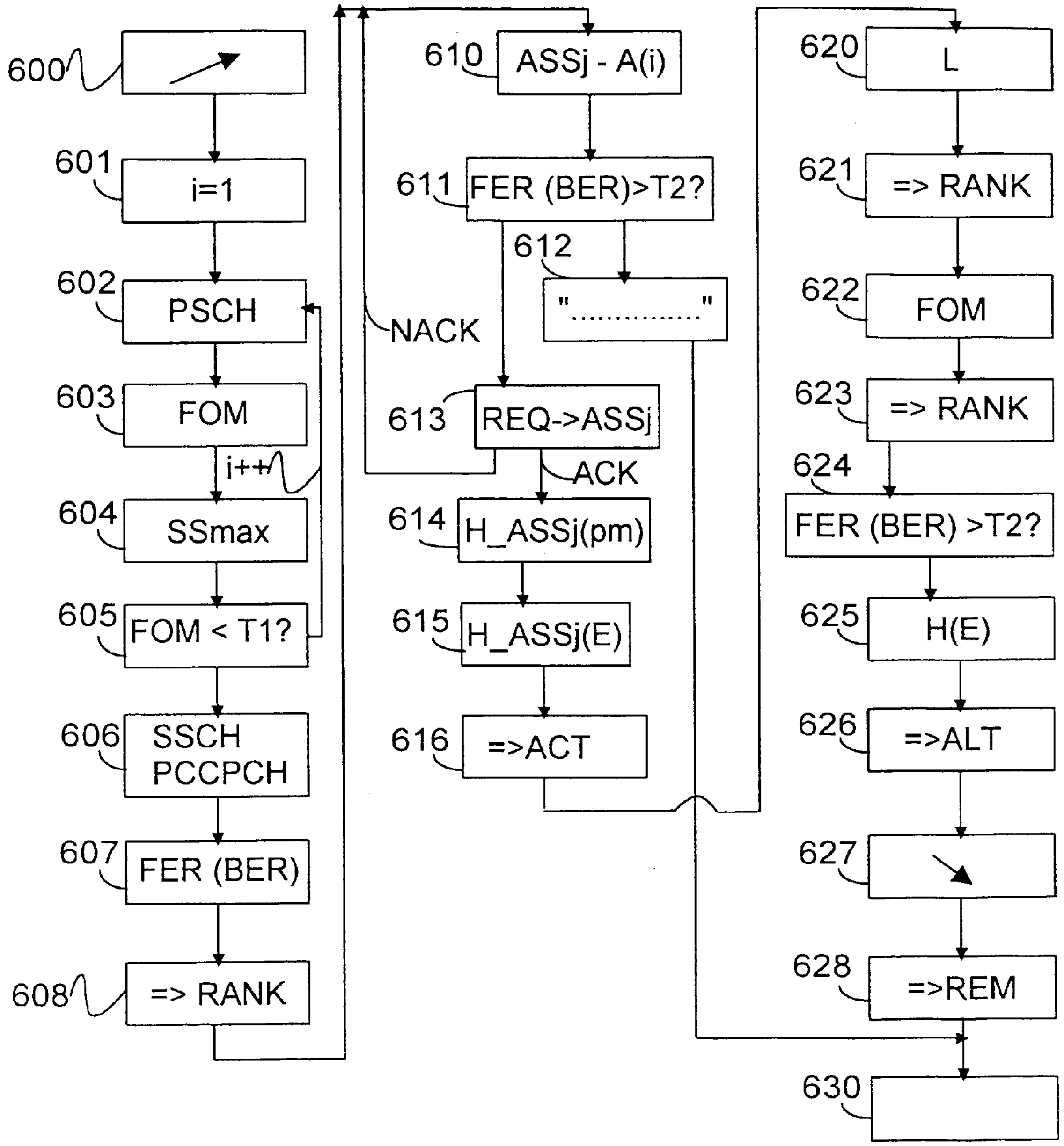
FIG. 9 is a diagram showing the steps of an embodiment of an initialization phase for a CDMA primary station.

A detailed example of an initialization phase will now be described with reference to FIG. 9 for a CDMA primary station that has a plurality of directional antennas.

In step 600, the primary station is powered on. In step 601, an index i is set to one, indicating that the processing will start by using antenna A(i=1). In step 602, the primary station scans the PSCH availability by correlating the received signal with a local copy of the spreading code of the PSCH (PSCH stands for Primary Synchronization Channel). Then in step 603, the quality of the received signal (called FOM for Figure Of Merit) is evaluated by means of the received power for each available secondary station. Then in step 604, the secondary station $SS_{MAX}$ having the highest quality is selected. In step 605, its quality is compared to a threshold T1. This threshold T1 corresponds to the minimum level allowing acceptable detection of the received signal. If the evaluated quality is below the threshold, index i is incremented and processing is repeated from step 602 with another antenna A(i+1). If the quality exceeds the threshold, further processing is performed in step 606 to obtain complete identification of the selected secondary station. This further processing includes:

- scanning the SSCH incoming channel by correlation with a local version of the possible SSCH spreading codes (SSCH stands for Secondary Synchronization Channel).
- decoding the code group that corresponds to the received secondary station by using the spreading code of the SSCH.
- synchronizing the primary station with the cell frame timing.
- scanning the PCCPCH in order to identify the secondary station scrambling code (PCCPCH stands for Primary Common Control Physical Channel).
- decoding the secondary station scrambling code.

At this point the received secondary station is completely identified. Alternative quality data may be calculated. For example the BER based on the PCCPCH pilot bits, or the FER based on the PCCPCH complete frame. This new quality data is calculated in step 607. In step 608, this quality data is stored in the RANK table.

Once the process corresponding to the selected secondary station has been completed, the process is repeated from step 604 for the remaining available secondary stations.

Once the process has been completed for all available secondary stations and for antenna A(i), the index i is incremented and, if $i \leqq i_{MAX}$, the process is repeated for antenna A(i+1). When $i > i_{MAX}$, the process goes on the step 610.

In step 610, the secondary station—antenna pair having the highest quality is selected. In step 611, the quality of this pair is tested against a threshold T2 (T2 is defined depending on the quality data which is used; if it is the received power then T2=T1). If the quality data is below the threshold, no system is available and an information message is delivered to the user (step 612) and the process terminates at step 630. If the quality data of the selected pair is above the threshold, the primary station sends a request (REQ) to the selected secondary station for adding this secondary station to the active set (step 613). If this request is acknowledges (ACK), the primary station measures the heading of the secondary station of the selected pair in local coordinates in step 614. Then, in step 615, the coordinates of the heading are converted in an earth coordinate system. In step 616, the heading is stored together with the quality data in the active set ACT. If the request is rejected (NACK), the process goes back to step 610 for selecting another pair relating to another secondary station.

In step 620, a "neighbors" list L corresponding to the active secondary station is read in the common downlink channel. In step 621, identity of the members of the list are loaded in the RANK table, setting a file for each secondary station. In step 622, a dedicated scanning is performed for each secondary station using all antennas. This process provides quality data for each secondary station—antenna pair. In step 623, these quality data are stored in the RANK table. In step 624, the quality data are compared to the threshold T2. RANK positions exceeding the threshold are considered as alternative secondary stations. In step 625, their headings are calculated in the earth coordinate system. In step 626, the headings are stored together with the corresponding quality data in the alternative set ALT. Once the alternative set is filled up, it is reordered (at step 627) using the value of the quality data as a criterion. Secondary stations of highest quality occupy first positions. In step 628 the quality data of the remaining secondary stations are stored in the remaining set REM. The initialization process terminates in step 630.

Figure 10:
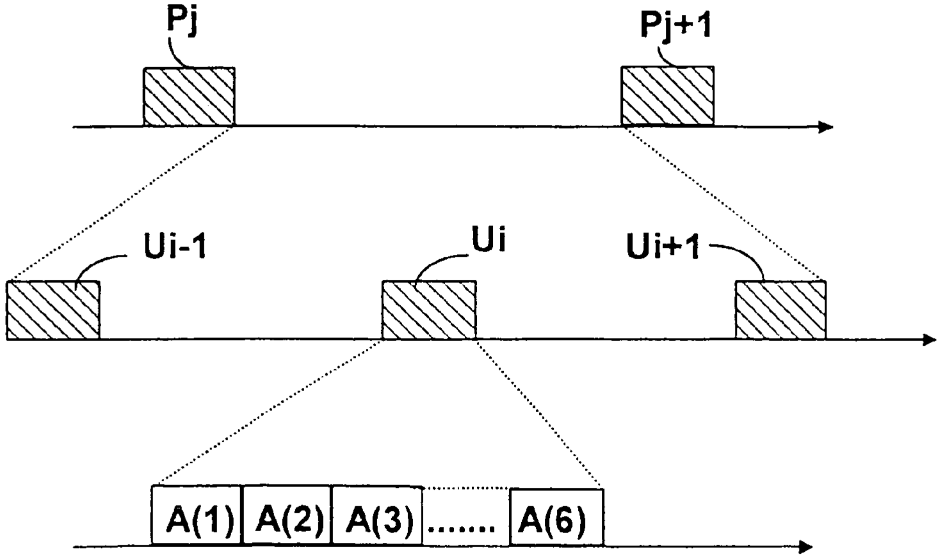
FIG. 10 is a time diagram showing updating intervals interleaved with paging intervals.

A detailed example of the updating phase will now be described with reference to FIGS. 10 and 11 for a CDMA primary station having a plurality of directional antennas. As indicated in FIG. 10, updating intervals $U_i$ are interleaved between paging intervals $P_j$ in order to avoid losing incoming calls. During one updating interval, one secondary station is scanned through all antennas. This means that the updating interval contains a sub-interval dedicated to each antennas. During this sub-interval spreading code correlation is performed and the quality data is evaluated.

Figure 11:
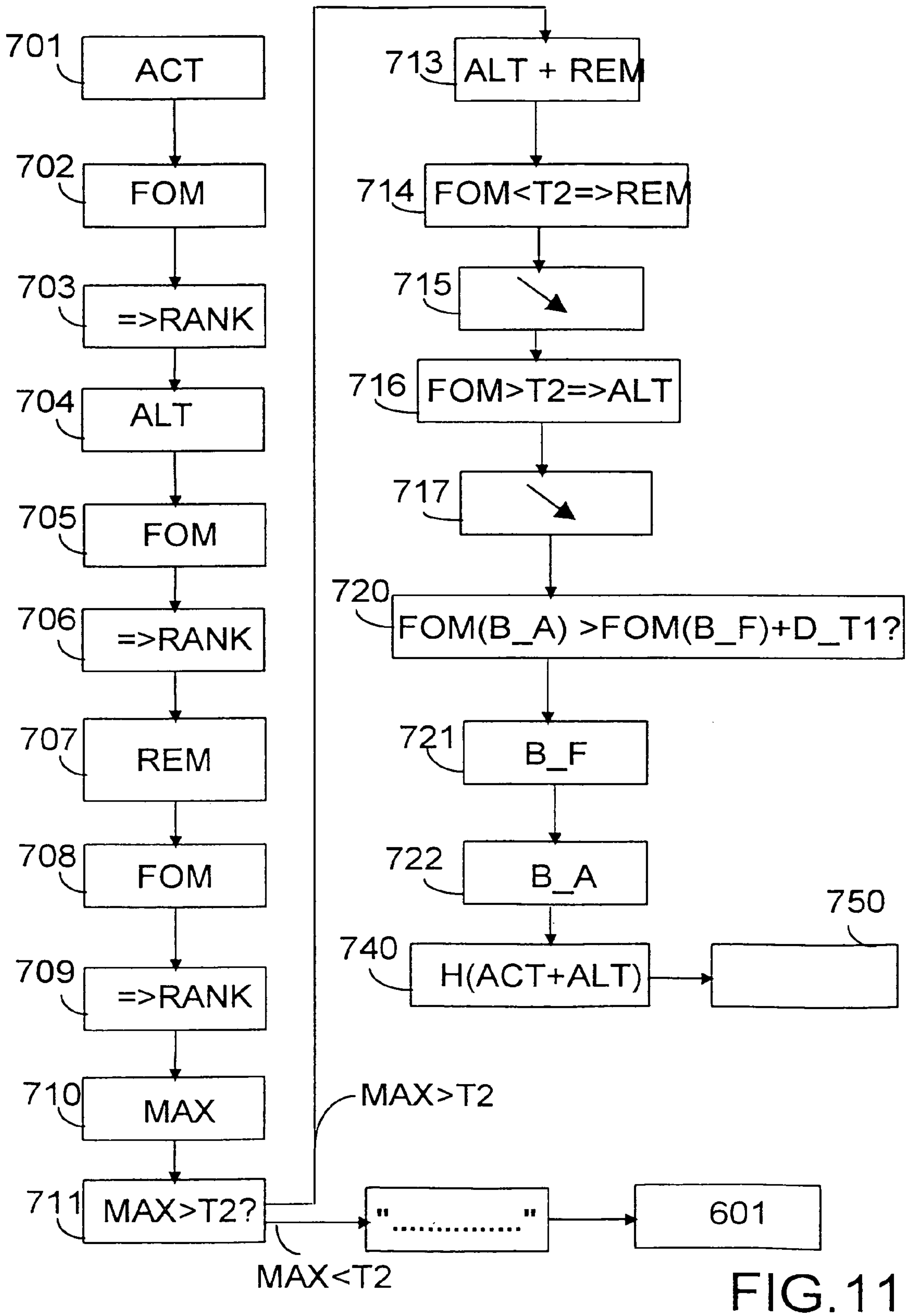
FIG. 11 is a diagram showing the steps of an embodiment of an updating phase for a CDMA primary station.

FIG. 11 is a block diagram indicating the steps of an example of such an updating process. In step 701, the primary station reads the identifier(s) of the secondary station(s) contained in the active set. In step 702, the primary station scans the corresponding secondary station(s) through all available antennas and elaborates the corresponding quality data (called FOM). In step 703, the information is stored in the RANK table. In step 704, the primary station reads the identifier(s) of the secondary station(s) contained in the alternative set. In step 705, the primary station scans the corresponding secondary station(s) through all available antennas and elaborates the corresponding quality data. In step 706, the information is stored in the RANK table. In step 707, the primary station reads the identifier(s) of the secondary station(s) contained in the remaining set. In step 708, the primary station scans the corresponding secondary station(s) through all available antennas and elaborates the corresponding quality data. In step 709, the information is stored in the RANK table. In step 710, the primary station searches for the Maximum MAX of the quality data. In step 711, the value of this maximum is checked. If it is below the threshold T2, this means that the system is unavailable. In step 712, a message is displayed to inform the user. Then the operation starts again at the beginning of the initialization process (step 601). If it is above the threshold T2, the updating process goes on. In step 713, the primary station scrolls all secondary stations contained in the alternative and remaining sets:

If the quality data (FOM) for one secondary station is below the threshold T2, this secondary station is loaded into the remaining set (step 714). Once the scrolling has been completed, the remaining set is reordered in descending order (step 715).

If the quality data of one secondary station is above the threshold T2, this secondary station is loaded into the alternative set (step 716). Once the scrolling has been completed, the alternative set is reordered in descending order (step 717).

Then, in step 720, secondary stations belonging to the alternative set (B_A) are compared with a new threshold resulting from the quality data of the former active secondary station (B_F) and in additional difference (D_T1). If no secondary station exceeds this new threshold, the former secondary station (B_F) is confirmed for the next period (step 721). If there are secondary stations exceeding the new threshold, the one having the highest quality (FOM) becomes the active secondary station (step 722). This means that a handoff occurs. This secondary station is loaded into the active set.

In step 740, headings of the secondary stations of the active and alternative set are calculated and stored in the corresponding set. The updating process terminates in step 750.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

What is claimed is:

1. A mobile station for use in a communication system including a plurality of base stations, said mobile station comprising:

a multi-directional controllable antenna structure operable to transmit and receive radio signals;

acquisition means for acquiring data relating to at least one of said base stations from at least one radio signal received by said multi-directional controllable antenna structure;

selection means for, based on the acquired data, conditionally selecting at least an active base station and conditionally selecting at least an alternative base station suitable for becoming active;

calculation means for calculating directions of signals received from the selected base stations;

storage means for storing the calculated directions; and control means for controlling said multi-directional controllable antenna structure in dependence of the stored directions.

2. The mobile station of claim 1, further comprising:

tracking means for tracking a direction of the active base station with said multi-directional controllable antenna structure.

3. The mobile station of claim 1, wherein said multi-directional controllable antenna structure includes a plurality of directional antennas;

wherein the acquired data are quality data associated with at least one base station/directional antenna pairing; and wherein the active base station is the base station associated with a base station/directional antenna pairing having a highest quality data.

4. A method for controlling a multi-directional controllable antenna structure in a mobile station intended to communicate with a plurality of base stations of a radio communication network, said method comprising:

acquiring data relating to at least one of said base stations from at least one radio signal received by the multi-directional controllable antenna structure;

based on the acquired data, conditionally selecting at least an active base station and conditionally selecting at least an alternative base station suitable for becoming active;

calculating directions of signals received from the selected base stations;

storing the calculated directions; and controlling the multi-directional controllable antenna structure in dependence of the stored directions.

5. A method for controlling a multi-directional controllable antenna structure in a mobile station intended to communicate with a plurality of base stations of a radio communication network, said method comprising:

acquiring data relating to at least one of said base stations from at least one radio signal received by the multi-directional controllable antenna structure;

based on the acquired data, conditionally selecting at least an active base station and conditionally selecting at least an alternative base station suitable for becoming active;

calculating directions of signals received from the selected base stations;

storing the calculated directions; and controlling the multi-directional controllable antenna structure in dependence of the stored directions.

6. The method of claim 4, wherein the multi-directional controllable antenna structure includes a plurality of directional antennas;

wherein the acquired data are quality data associated with at least one base station/directional antenna pairing; and wherein the active base station is the base station associated with a base station/directional antenna pairing having a highest quality data.

7. A radio communication system, comprising:

a plurality of base stations; and a mobile station including a multi-directional controllable antenna structure operable to transmit and receive radio signals, acquisition means for acquiring data relating to at least one of said base stations from at least one received radio signal, selection means for, based on the acquired data, conditionally selecting at least an active base station and conditionally selecting at least an alternative base station suitable for becoming active, calculation means for calculating directions of signals received from the selected base stations, storage means for storing the calculated directions, and control means for controlling said antenna structure in dependence of the stored directions.

8. The radio communication network of claim 7, wherein said mobile station further includes tracking means for tracking a direction of an active base station with said multi-directional controllable antenna structure.

9. The radio communication network of claim 7, wherein the multi-directional controllable antenna structure includes a plurality of directional antennas;

wherein the acquired data are quality data associated with at least one base station/directional antenna pairing; and wherein the active base station is the base station associated with a base station/directional antenna pairing having a highest quality data.

10. A computer program for use in a mobile station having a multi-directional controllable antenna structure and intended to be used in a radio communication network having a plurality of base stations, said computer program comprising computer program code means to make the mobile station:

acquire data relating to at least one of said base stations from at least one radio signal received by the multi-directional controllable antenna structure;

based on the acquired data, conditionally select at least an active base station and conditionally select at least an alternative base station suitable for becoming active;

calculate directions of signals received from the selected base stations;

store the calculated directions; and control the multi-directional controllable antenna structure in dependence of the stored directions.

11. The computer program of claim 10, wherein said computer program further comprises computer program means to make the mobile station track a direction of the active base station with the multi-directional controllable antenna structure.

12. The computer program of claim 10, wherein the multi-directional controllable antenna structure includes a plurality of directional antennas;

wherein the acquired data are quality data associated with at least one base station/directional antenna pairing; and wherein the active base station is the base station associated with a base station/directional antenna pairing having a highest quality data.

* * * * *